United States Patent
Jakab et al.

(10) Patent No.: US 8,499,299 B1
(45) Date of Patent: Jul. 30, 2013

(54) ENSURING DETERMINISTIC THREAD CONTEXT SWITCHING IN VIRTUAL MACHINE APPLICATIONS

(75) Inventors: Arpad Jakab, Oakland, CA (US); Humberto Yeverino, Menlo Park, CA (US); Suman Cherukuri, Cupertino, CA (US); Jeffrey Daudel, South San Francisco, CA (US); Jonathan Lindo, Emerald Hills, CA (US)

(73) Assignee: CA, Inc., Islandia, NY (US)

( * ) Notice: Subject to any disclaimer, the term of this patent is extended or adjusted under 35 U.S.C. 154(b) by 431 days.

(21) Appl. No.: 12/825,932

(22) Filed: Jun. 29, 2010

(51) Int. Cl.
- G06F 9/455 (2006.01)
- G06F 9/46 (2006.01)
- G06F 11/00 (2006.01)
- G06F 9/44 (2006.01)
- G06F 13/22 (2006.01)
- G06F 12/00 (2006.01)

(52) U.S. Cl.
USPC ............... 718/102; 718/1; 718/100; 717/124; 717/127; 717/131; 710/200; 710/220; 710/243; 710/244; 714/25; 714/38.1

(58) Field of Classification Search
USPC ....... 718/1–105, 108; 717/120–135; 719/318; 710/200, 220, 240–244; 714/25, 38.1
See application file for complete search history.

(56) References Cited

U.S. PATENT DOCUMENTS

| | | | |
|---|---|---|---|
| 5,828,880 A | 10/1998 | Hanko | |
| 5,966,702 A | 10/1999 | Fresko et al. | |
| 6,081,665 A | 6/2000 | Nilsen et al. | |
| 6,101,524 A | 8/2000 | Choi et al. | |
| 6,499,048 B1 * | 12/2002 | Williams | 718/102 |
| 6,832,367 B1 | 12/2004 | Choi et al. | |
| 6,854,108 B1 | 2/2005 | Choi | |
| 6,883,166 B1 | 4/2005 | Thompson | |
| 6,886,081 B2 | 4/2005 | Harres | |
| 7,506,318 B1 * | 3/2009 | Lindo et al. | 717/130 |
| 7,673,181 B1 * | 3/2010 | Lindo et al. | 714/38.13 |
| 8,079,019 B2 * | 12/2011 | Lindo et al. | 717/129 |
| 8,402,318 B2 * | 3/2013 | Nieh et al. | 714/38.1 |
| 2003/0033344 A1 | 2/2003 | Abbott et al. | |
| 2003/0135844 A1 | 7/2003 | Yellin et al. | |

(Continued)

OTHER PUBLICATIONS

U.S. Appl. No. 11/449,158, filed Jun. 7, 2006, Final Office Action, Mailed Nov. 23, 2010.

(Continued)

Primary Examiner — Meng An
Assistant Examiner — Abdullah Al Kawsar
(74) Attorney, Agent, or Firm — Vierra Magen Marcus LLP

(57) ABSTRACT

Techniques for ensuring deterministic thread context switching in a virtual machine application program include, in one embodiment, providing a single application-level mutex that threads of the executing application program are forced to acquire to execute application code of the virtual machine application program. During a first recorded execution of the virtual machine application program, a record is created and stored in a computer that indicates the order in which threads acquire the application-level mutex. In a subsequent replay execution of the virtual machine application program from the recording, threads of the virtual machine application program are managed to ensure that the application-level mutex is acquired by threads in the same order indicated in the record such that any race conditions that occurred during the recorded execution as a result of executing application code are reproduced during the subsequent replay execution thereby aiding application development personnel in identifying and isolating program errors and bugs related to race conditions.

27 Claims, 9 Drawing Sheets

U.S. PATENT DOCUMENTS

| | | | |
|---|---|---|---|
| 2003/0149966 A1 | 8/2003 | McGuire | |
| 2004/0019887 A1 | 1/2004 | Taylor et al. | |
| 2004/0153996 A1 | 8/2004 | Boykin et al. | |
| 2004/0267804 A1 | 12/2004 | Fresko et al. | |
| 2005/0177821 A1 | 8/2005 | Ogata et al. | |
| 2005/0216885 A1 | 9/2005 | Ireland | |
| 2006/0271922 A1 | 11/2006 | Chan et al. | |
| 2007/0039000 A1* | 2/2007 | Lakshmikantha et al. | 718/100 |
| 2008/0115117 A1 | 5/2008 | Wilkinson et al. | |
| 2008/0141255 A1 | 6/2008 | Browning et al. | |
| 2008/0209422 A1* | 8/2008 | Coha | 718/102 |
| 2008/0276227 A1 | 11/2008 | Greifeneder | |
| 2008/0313652 A1* | 12/2008 | Klein et al. | 719/318 |
| 2009/0119665 A1 | 5/2009 | Venkitachalam et al. | |
| 2009/0235002 A1* | 9/2009 | Nir-Buchbinder et al. | 710/240 |
| 2009/0235262 A1* | 9/2009 | Ceze et al. | 718/102 |
| 2010/0042789 A1 | 2/2010 | Gonion et al. | |
| 2010/0057965 A1* | 3/2010 | Nir-Buchbinder et al. | 710/200 |
| 2010/0287352 A1* | 11/2010 | Chapman et al. | 711/170 |
| 2010/0318991 A1* | 12/2010 | Venkitachalam et al. | 718/1 |
| 2012/0204060 A1 | 8/2012 | Swift et al. | |

OTHER PUBLICATIONS

U.S. Appl. No. 12/825,923, filed Jun. 29, 2010.
U.S. Appl. No. 12/826,435, filed Jun. 29, 2010.
U.S. Appl. No. 12/826,447, filed Jun. 29, 2010.
Office Action dated Sep. 14, 2012, U.S. Appl. No. 12/825,923, filed Jun. 29, 2010.
Czajkowski, et al., "Multitasking Without Compromise: a Virtual Machine Evolution," Proceedings of the 16th ACM SIGPLAN conference on Object-oriented programming, systems, languages, and application, Nov. 1, 2001; pp. 125-138, 14 pages.
Office Action dated Jan. 18, 2013, U.S. Appl. No. 12/826,435, filed Jun. 29, 2010.
Marcel C. Baur, "Instrumenting Java Bytecode to Replay Execution Traces of Multithreaded Programs", ETH Zurich, Apr. 9, 2003, 156 pg <INstReplay.pdf>.
Response to Office Action dated Dec. 14, 2012, U.S. Appl. No. 12/825,923, filed Jun. 29, 2010, 22 pages.
Response to Office Action dated Apr. 18, 2013, U.S. Appl. No. 12/826,435, filed Jun. 29, 2010, 30 pages.
Office Action Restriction dated May 21, 2013, U.S. Appl. No. 12/826,447, filed Jun 29, 2010, 10 pages.
Response to Office Action Restriction dated Jun. 17, 2013, U.S. Appl. No. 12/826,447, filed Jun. 29, 2010, 7 pages.

* cited by examiner

ENSURING DETERMINISTIC THREAD CONTEXT SWITCHING IN VIRTUAL MACHINE APPLICATIONS

TECHNICAL FIELD

Embodiments are generally directed to virtual machines, and, more particularly, to ensuring deterministic thread context switching in virtual machine applications.

BACKGROUND

Threads are commonly used in computer programs to achieve concurrency in computer systems. Very generally, a thread is a sequence of computer-executable instructions that executes independently of other sequences of instructions. Many modern computer processors and computer operating systems are capable of scheduling and executing multiple threads concurrently and allowing threads to interact through shared resources or shared program state. A computer program that executes with multiple threads of execution is often said to be a "multi-threaded" computer program.

Among the types of computer programs that can be multi-threaded are computer programs that execute on some virtual machines. Such programs typically contain instructions that are interpreted at runtime and executed by a virtual machine that interfaces with the operating system of the physical hardware on which the virtual machine executes. The virtual machine is an entity that executes machine language instructions in response to the interpretation of corresponding virtual machine instructions, such as bytecode. The Java Virtual Machine (JVM) is an example of such a virtual machine, although there are several virtual machines capable of executing such programs. Components of the .NET Framework available from the Microsoft Corporation of Redmond, Wash. are other examples of such a virtual machine.

It is often desirable to be able to replicate the execution of a virtual machine computer program in a manner such that the executing program exhibits, during replay of a recorded program execution, the same behavior that the program exhibited when the program originally executed. For example, a programmer might wish to record a virtual machine computer program's behavior in a production environment and then replay that program in a debugging environment in order to locate and fix possible errors in the program code—errors that caused unexpected or undesirable results in the production environment. Under such circumstances, if the program behaves differently when replayed in the debugging environment than the program behaved in the production environment, the programmer may have great difficulty in isolating the source of the problems that were previously encountered.

One aspect of a multi-threaded virtual machine application program that may behave differently when replayed is thread context switching by the operating system underlying the virtual machine. In this context, thread context switching refers to the time at which a processor is switched by the operating system from executing one thread to executing another. This thread context switching is largely non-deterministic because this switch time is not readily predictable. Consequently, there is no inherent guarantee that the order of virtual machine application code executed by multiple threads will be the same during separate executions of the virtual machine application program. If the order of application code performed by multiple threads is different when replayed in the debugging environment than the order in the production environment, the programmer may have great difficulty in isolating the source of the problems that were previously encountered, especially if the source of the problems is dependent on the order of application code executed by the multiple threads. Further, if the order of application code performed by multiple threads is different when replayed in the debugging environment than the order in the production environment, information recorded about the program's behavior in the production environment may become "out-of-sync" during replay of the program in the debugging environment.

One source of program bugs and errors in virtual machine application programs that is dependent on the order of application code executed by multiple threads are race conditions. Very generally, a race condition occurs when an output or result of computer program depends on the sequence or timing of execution events. A race condition can arise during execution of a multi-threaded virtual machine program because of thread context switching. For example, two threads may update a shared data structure at nearly the same time, and the program may execute correctly only when the two threads perform updates in one and only one order. If, because of thread context switching, the order of application code performed by multiple threads is different when replayed in the debugging environment than the order in the production environment, then a race condition that occurred when the program was recorded in the production environment may not be accurately reproduced when the program is replayed in the debugging environment. This is problematic for computer program developers and testers if the source of a bug in the program is the race condition because the program when replayed may not exhibit the race condition previously encountered in the production environment.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
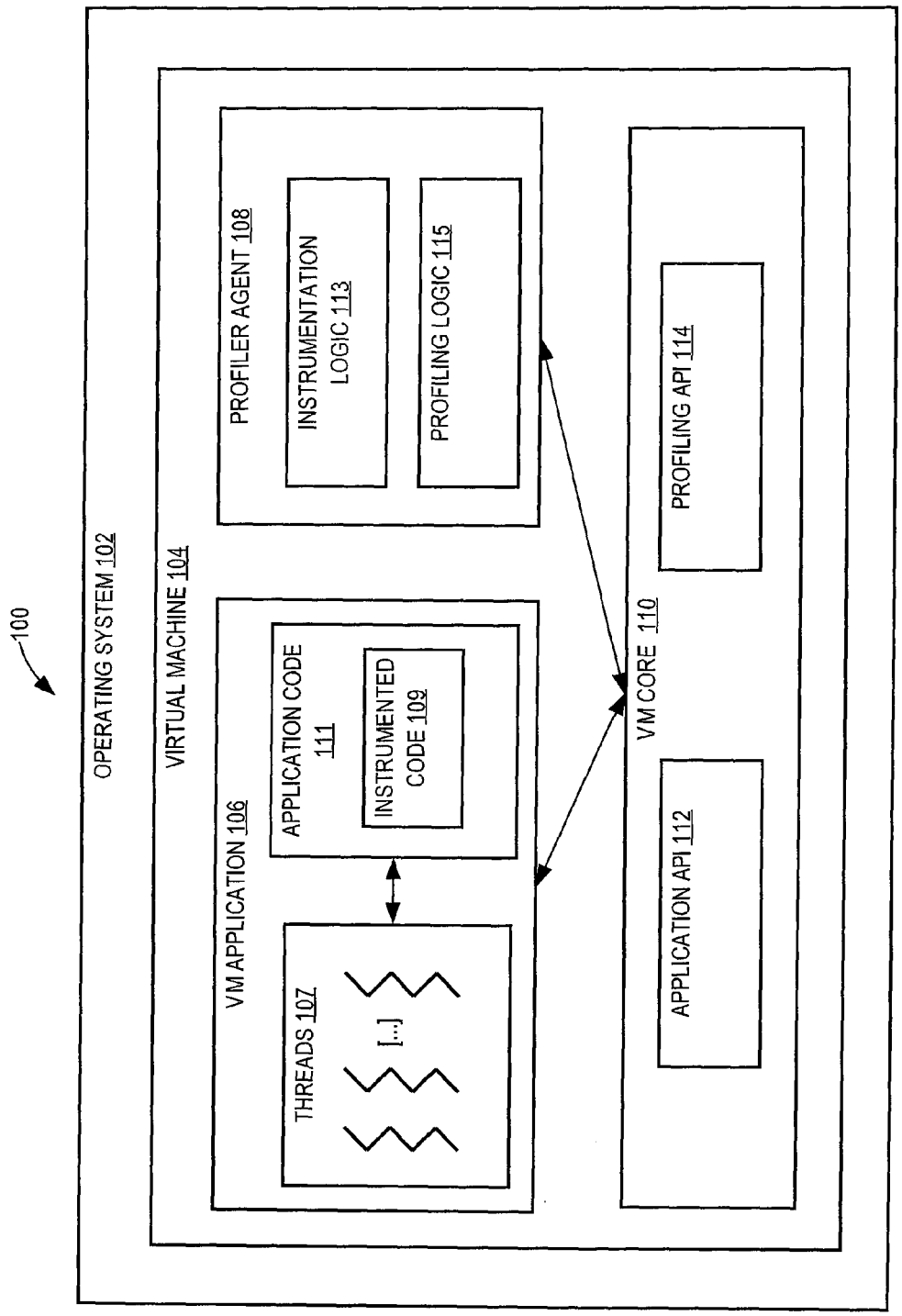
FIG. 1 is a very general block diagram of a record and replay system in which techniques for ensuring deterministic tread context switching in virtual machine applications may be implemented.

Techniques for ensuring deterministic thread context switching in virtual machine applications are disclosed and described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

---

1.0 Functional Overview
2.0 Structural Overview - Record and Replay System
3.0 Methods For Ensuring Deterministic Thread Context Switching in Virtual Machine Applications
    3.1 Serialized Approach
    3.2 Preventing Deadlocks In the Serialized Approach
    3.3 Enhancements to the Serialized Approach
4.0 Implementation Mechanisms - Hardware Overview
5.0 Extensions and Alternatives

---

1.0 FUNCTIONAL OVERVIEW

Techniques for ensuring deterministic thread context switching in a virtual machine application program include, in one embodiment, providing a single application-level mutex that threads of the executing application program are forced to acquire to execute application code of the virtual machine application program. During a first recorded execution of the virtual machine application program, a record is created and stored in a computer that indicates the order in which threads acquire the application-level mutex. In a subsequent replay execution of the virtual machine application program from the recording, threads of the virtual machine application program are managed to ensure that the application-level mutex is acquired by threads in the same order indicated in the record such that any race conditions that occurred during the recorded execution as a result of executing application code are reproduced during the subsequent replay execution thereby aiding application development personnel in identifying and isolating program errors and bugs related to race conditions.

In one aspect, the techniques include detecting when a thread of the virtual machine application program is about to make a potentially blocking method or function call and forcing the thread to release the application-level mutex before making the potentially blocking call thereby allowing another thread of the virtual machine application program to acquire the application-level mutex and execute application code. The thread is forced to re-acquire the application-level mutex after the potentially blocking call completes and before continuing to execute application code. In one embodiment, potentially blocking calls include any native method or function call.

In another aspect, to prevent the application-level mutex from causing deadlocks during execution, threads are forced to release the application-level mutex before acquiring other mutexes.

In yet another aspect, threads are forced to release the application-level mutex only when attempting to acquire another mutex currently held by another thread.

In still yet another aspect, a record is created and stored in a computer indicating whether threads acquire mutexes other than the application-level mutex during execution of the virtual machine application program deterministically or non-deterministically. The record is consulted when a thread attempts to acquire a mutex currently held by another thread. If the other thread acquired the mutex deterministically, then the thread attempting to acquire the mutex is forced to release the application-level mutex so that the other thread can acquire the application-level mutex and ultimately release the mutex. If, on the other hand, the other thread acquired the mutex non-deterministically, then the thread attempting to acquire the mutex retains the application-level mutex until the other thread releases the mutex.

In yet another aspect, the techniques are implemented by a combination of instrumented code added to application code of the virtual machine application program and event handling logic of a profiler agent of the virtual machine executing the virtual machine application program. In one embodiment, the virtual machine is a Java Virtual Machine (JVM) executing a Java application program and the profiler agent is a Java Virtual Machine Tool Interface (JVMTI) agent of the Java Virtual Machine.

In other embodiments, the techniques encompasses a computer-readable non-transitory medium encoded with instructions which when executed may cause one or more processors to perform the functions of the system described in this section, and a system comprising means for performing the functions of the system described in this section, and a method, which may be computer-implemented, comprising steps corresponding to the functions of the system described in this section.

2.0 STRUCTURAL OVERVIEW

Record and Replay System

FIG. 1 is a very general block diagram of a record and replay system 100 in which techniques for ensuring deterministic thread context switching in virtual machine applications may be implemented. The system 100 includes a kernel or operating system 102. The operating system 102 provides interfaces to hardware of a computer system, such as computer system 600 of FIG. 6, for application programs, such as virtual machine 104, and supervises and controls the application programs. Thus, in most cases, the operating system 102 isolates the applications from the hardware. In one embodiment, the operating system 102 is based upon a kernel element, but a kernel-based operating system is not required. Non-limiting examples of operating systems suitable for use as operating system 102 include the Microsoft® Windows family of operating systems available from Microsoft Corporation of Redmond, Wash. and the Red Hat distribution of Linux from Red Hat, Inc. of Durham, N.C.

An application virtual machine 104 runs on the operating system 102 and can execute a virtual machine application program 106. The virtual machine 104 emulates a computer system defined by a specification allowing virtual machine application 106 to run a wide variety of computer systems and operating systems. One non-limiting example of a virtual machine suitable for use as virtual machine 104 is the Java Virtual Machine (JVM). Other non-limiting examples include the Virtual Execution System (VES) and the Common Language Runtime (CLR) that are part of the .NET framework available from Microsoft Corporation of Redmond, Wash.

The virtual machine 104 includes virtual machine core 110 for interfacing with the underlying operating system 102 and for abstracting details of the particular underlying operating system 102 from the virtual machine application 106. Thus, in most cases, the virtual machine 104 isolates the virtual machine application 106 from the operating system 102. The virtual machine core 110 provides an Application Programming Interface (API) 112 to the operating system 102 for the virtual machine application 106, and supervises and controls the virtual machine application 106. In one embodiment, the virtual machine application 106 is developed in a high-level programming language (e.g., Java, C#, VB.NET, and J#) as source code. The source code is then compiled into an intermediate language such as Java bytecode or the Common Intermediate Language (CIL) capable of being executed by the virtual machine 104 to carry out of the programmed functions of the virtual machine application 106. As used herein, the term "application code" and the term "bytecode" refer interchangeably to any set of instructions of a virtual machine application that are capable of being executed by a virtual machine as opposed to native instructions that are capable of being executed only by the underlying operating system. Further, the term "bytecode" as used herein is not limited to only Java bytecode and includes other types of instructions that are capable of being executed by types of virtual machines other than a Java Virtual Machine.

The virtual machine 104 also includes a profiler agent 108 for profiling the execution of the virtual machine application 106. Profiling refers to programmatically obtaining, analyzing, and inspecting state of the virtual machine application 106 and programmatically controlling the execution of the virtual machine application 106. The virtual machine core 110 provides a profiler API 114 allowing the profiler 108 to gain access to selected state of the virtual machine application 106 during execution and allowing the profiler agent 108 to control aspects of the execution of the virtual machine application 106. In one embodiment, the profiler API 114 provides a two-way interface allowing profiling logic 115 to receive notifications of execution events as they occur during execution of the virtual machine application 106 and also allowing profiling logic 115 to query and control the virtual machine application 106, either in response to received notifications or independent of them. In one embodiment, the profiler agent 108 is embodied as software as a dynamic link library (DLL) or other type of software library that is statically or dynamically linked and loaded into the virtual machine. Thus, in this embodiment, the profiler agent 108 executes in the same process with the virtual machine 104 executing the virtual machine application 106 being profiled. In other embodiments, the profiler agent 108 executes as a process separate from the process executing the virtual machine 104 and an inter-process communication mechanism facilitated by the operating system 102 is used to facilitate communication between the virtual machine 104 and the profiler agent 108. In one embodiment in which the virtual machine 104 is a Java Virtual Machine, the profiler API 114 includes the Java Virtual Machine Tool Interface (JVMTI) and the Java Native Interface (JNI) and the profiler agent 108 executes as a client of the virtual machine 104 as a JVMTI agent.

In some circumstances, the virtual machine 104 may not provide a direct interface for the profiler agent 108 to obtain information about certain execution events that the profiler agent 108 is interested in or provide a direct interface to control the execution of the virtual machine application 106 in a desired manner. In these circumstances, in addition to bytecode provided by a developer of the virtual machine application 106 and bytecode comprising standard libraries and third-party libraries used by the virtual machine application 106, application bytecode 111 may include instrumented bytecode 109. In one embodiment, the virtual machine 104 provides the ability to instrument the virtual machine application 106 with additional bytecode 109 that, when executed by the virtual machine 104 as part of executing the virtual machine application 106, provides the profiler agent 108 with the desired information or controls the virtual machine application 106 in the desired manner. The process of programmatically adding bytecode to an existing virtual machine application may be termed as "instrumentation" of the virtual machine application. Instrumentation may be used to cause the virtual machine application 106 to perform virtually any function that the virtual machine application itself could have been originally programmed to perform. Thus, instrumentation refers broadly to programmatically adding any bytecode to existing virtual machine application bytecode such that the added bytecode may be executed along with the existing application bytecode when the virtual machine application is executed by the virtual machine.

In one embodiment, the profiler agent 108 contains instrumentation logic 113 for instrumenting the virtual machine application 106 with instrumented bytecode 109. The instrumentation logic 113 may use a programmatic interface provided by the virtual machine 104 to accomplish the instrumentation of the virtual machine application 106. In one embodiment, the profiler agent 108 instruments the virtual machine application 106 before a class, object, module, or other logical portion of application bytecode is loaded for execution by the virtual machine 104. When the virtual machine 104 loads a class, object, module, or portion of application bytecode for execution, the virtual machine 104 notifies the profiler agent 108 through an API thus giving the profiler agent 108 an opportunity to inspect and instrument the class, object, module, or portion before the class, object, module, or portion begins to execute. Once loaded, the class, object, module, or portion executes with the bytecode added by instrumentation. For example, in one embodiment in which the virtual machine 104 is a Java Virtual Machine, the virtual machine 104 notifies the profiler agent 108 as Java classes referenced by the virtual machine application 106 are loaded by the virtual machine 104 giving the profiler agent 108 the opportunity to inspect and instrument the bytecode of the Java classes before they are loaded for execution by the virtual machine 104.

In one embodiment, the techniques described herein for ensuring deterministic thread context switching in virtual machine applications are embodied in a combination of instrumented code 109, instrumentation logic 113, and profiling logic 115.

The virtual machine application 106 can be virtually any virtual machine application program capable of executing on the virtual machine 104. In one embodiment, the virtual machine application 106 is a Java application executing on a Java Virtual Machine 104. However, the virtual machine application 106 may be another type of application executing on another type of virtual machine. For example, the virtual machine application 106 can be an application executing on the Virtual Execution System (VES) or executing in the Common Language Runtime (CLR) environment. The Virtual Execution System (VES) and the Common Language Runtime (CLR) are both components of the .NET Platform software available from Microsoft Corporation of Redmond, Wash.

In executing the virtual machine application program 106, the virtual machine 104 makes calls into and receives return values from the operating system 102. At least some functionality intended for the virtual machine application program 106 cannot be achieved by the virtual machine 104 alone without the participation of the operating system 102. The operations performed by the virtual machine 104 itself, while executing the application program 102, will not vary from execution to execution; each time that the virtual machine 104 executes the application program 106, virtual machine 104 will perform exactly the same operations in response to the instructions of which the application program 106 is made up. Therefore, the behavior of the virtual machine 104 is said to be deterministic. The virtual machine application program 106 is also deterministic in nature. However, the virtual machine 104 has little to no control over the inner workings of the operating system 102, and the timing with which the operating system 102 responds to the virtual machine 104 largely cannot be anticipated. Indeed, different versions of the virtual machine 104 may be created to interface with different operating systems, and while the operations of each version of the virtual machine 104 will remain consistent between versions (according to the specification of the virtual machine 104), the different operating systems with which the different versions of the virtual machine 104 interface may behave at least somewhat differently (e.g., in timing) from each other. Thus, the behavior of the operating system 102 is non-deterministic. There is no inherent guarantee that the operating system 102 will behave in exactly the same manner during separate executions of the application program 106, despite the fact that the application 106 and the virtual machine 104 remain constant during those separate executions.

In an embodiment, information identifying non-deterministic sources of input to virtual machine application 106 is recorded and stored by the record and replay system 100 as the virtual machine application 106 executes in a production environment, and the recorded execution of the virtual machine application 106 is later replayed by the record and replay system 100 in a debugging environment. As used herein, the term "production environment" refers broadly to any environment in which a virtual machine application's behavior is being programmatically recorded or observed and the term "debugging environment" refers broadly to any environment in which the virtual machine application's behavior as recorded or observed in the production environment is being replayed. Many mechanisms may provide non-deterministic input to the virtual machine application program 106. For example, some known sources of non-determinism include execution of native methods, garbage collection, class loading, linking, and initialization, just-in-time compilation (JIT), and thread context switching.

In one embodiment, recording execution of the virtual machine application program 106 involves record and replay system 100 programmatically capturing and storing information identifying all sources of non-determinism that may affect the program 106. Replay stream information is stored in persistent storage and identifies non-deterministic events and data. Test personnel can attach the stored replay stream information for a portion of a program that contains a bug results to a bug report and send the bug report to a developer. Execution of the virtual machine application program 106 is replayed by record and replay system 100 by running the program 106 and substituting information from the stored replay stream for all non-deterministic events that are associated with a recorded execution. This replay step can be performed by a developer who has received a bug report that contains an attached replay stream recording. Replaying enables the developer to immediately reproduce the bug by replaying the recorded replay stream. A non-limiting example of a commercially available record and replay system capable of recording and replaying a virtual machine application program is the Replay DIRECTOR™ available from Replay Solutions, Inc. of Redwood City, Calif.

As shown inside the virtual machine application 106 of FIG. 1, multiple threads 107 may execute within the virtual machine application 106. The implementation and scheduling of the threads 107 depends on a variety of factors including the thread scheduling strategy of the underlying operating system 102 and the processing environment in which the operating system 102 executes (e.g., single processor or multi-processor/multi-core environment). The operating system 102 may achieve concurrency by allowing a thread 107 of the virtual machine application 106 to execute for a small period of time (time-slice) before switching to another thread 107 after the currently executing thread's time-slice has expired. The virtual machine 104 may co-operate with the operating system 102 to determine when switching of threads occurs. Alternatively, the virtual machine 104 may delegate the scheduling of thread switching entirely to the operating system 102. Relative to the virtual machine application 106, the time at which a processor is switched from executing one thread 107 to executing another thread 107 is not readily predictable, so that the order of operations performed by the multiple threads 107 may vary, and therefore the path of execution in code of the virtual machine application 106 may vary among execution sessions. Because of this non-deterministic thread context switching, the path of execution in code by threads 107 of a multi-thread virtual machine application program 106 may vary among execution sessions. Thus, there is no inherent guarantee that a race condition that occurred in one execution session will also occur in another execution session. In context of record and replay systems, because of this non-deterministic thread context switching, there is no inherent guarantee that a race condition that occurred during a recoding session will also occur in a subsequent replay session.

Figure 2:
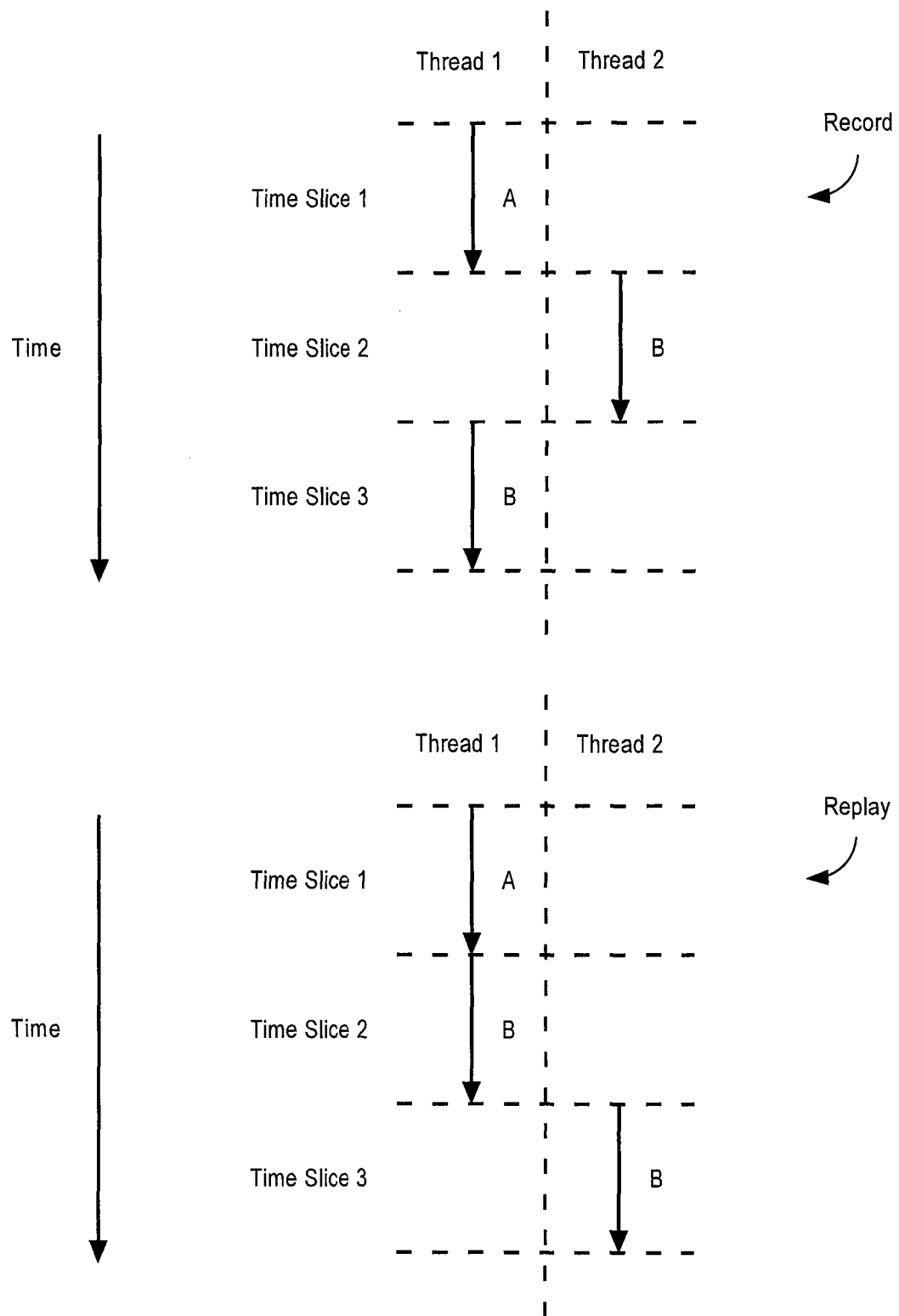
FIG. 2 illustrates an example of how non-deterministic thread context switching can cause a replayed execution of a virtual machine application program to behave differently than execution of the program when originally recorded.

FIG. 2 illustrates by an example how this non-deterministic thread context switching can cause a replayed execution of a virtual machine application program to behave differently than execution of the program when originally recorded. As shown in FIG. 2, during a first execution of a virtual machine application during which the application is being recorded, Thread 1 executes instruction A during Time Slice 1, then Thread 2 executes instruction B during Time Slice 2, and then Thread 1 executes instruction B during Time Slice 3. As shown in FIG. 2, because of non-deterministic thread context switching, during a subsequent replay execution of the virtual machine application, Thread 1 may execute instruction B before Thread 2 executes instruction B. This execution order during replay differs from the execution order that occurred during recording of the program. If instruction B accesses a resource or state shared by Thread 1 and Thread 2 then there is a race condition in the virtual machine application program because the result or outcome of the program depends on which of Thread 1 and Thread 2 executes instruction B first. If the order of application code performed by multiple threads is different when replayed in the debugging environment than the order in the production environment, a programmer may have great difficulty in isolating the source of the problems that were previously encountered, especially if the source of the problems is dependent on the order of application code executed by the multiple threads. For example, referring again to FIG. 2, if the source of a bug is dependent on Thread 2 executing instruction B before Thread 1, then the execution sequence during replay execution shown in FIG. 2 would not accurately reproduce the bug that occurred during record. Thus, techniques are needed for ensuring deterministic thread context switching in virtual machine applications. More particularly, techniques are needed to ensure that execution order of application code that occurred during recording of a virtual machine application program execution is accurately reproduced when the virtual machine application is replayed from the recording.

3.0 METHODS FOR ENSURING DETERMINISTIC THREAD CONTEXT SWITCHING IN VIRTUAL MACHINE APPLICATIONS

3.1 Serialized Approach

In an embodiment, thread management techniques are provided to ensure that thread context switches are deterministic in a virtual machine application during both record and replay execution of the application. The techniques do not require modifications to source code, virtual machine internals, or operating system internals or require deployment of a new version of the virtual machine application program through a software development process. The techniques guarantee that any race any and all race conditions that occur as a result of threads executing application code are accurately reproduced when the virtual machine application program execution is replayed. By virtue of ensuring that thread context switches are deterministic in both record and replay execution, difficult to isolate race conditions that occur in the production environment can be accurately and repeatedly reproduced in the debugging environment.

In one approach for ensuring thread context switches are deterministic termed a serialized approach, an application-level mutex is used to ensure that only one thread executes application code at a time. A developer of a virtual machine application can still write the application program as a multi-threaded application, but during recorded and replayed execution, the virtual machine runs in a serialized mode in which only one thread executes application bytecode at a time.

In the serialized mode, during both recording and replaying of a virtual machine application, each thread of the virtual machine application must acquire the application-level mutex before executing any application code of the virtual machine application. During recording of the virtual machine application, a record is maintained that records the order in which threads of the virtual machine application acquire the application-level mutex. During replay of the virtual machine application, acquisition of the application-level mutex by the threads is managed to ensure that threads acquire the application-level mutex in the same order as indicated by the record. During both record and replay, releasing of the application-level mutex by threads is managed to ensure that threads release the application-level mutex at the same deterministic points in execution. By virtue of such management, thread context switches in the virtual machine application when recorded and when replayed are deterministic. In particular, the order in which application code is executed by threads during replay execution is the same as the order in which the application code was executed during recorded execution. As such, any race conditions that occur during record as a result of threads executing application code are reproduced during replay. In addition, as described in greater detail below, acquiring and releasing of the application-level mutex by threads is managed during both record and replay execution to prevent threads from deadlocking.

Figure 3A:
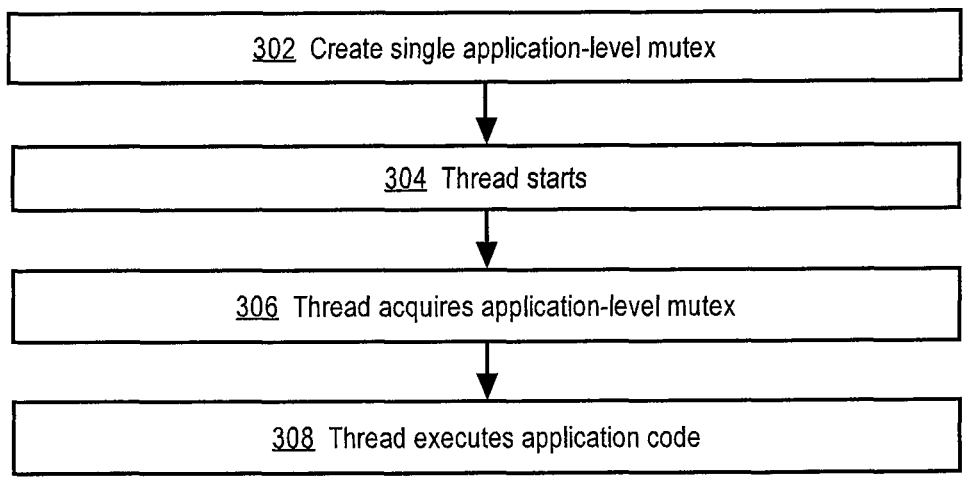
FIG. 3 is a flow diagram of one embodiment of a process for ensuring deterministic thread context switching in virtual machine applications.
Figure 3B:
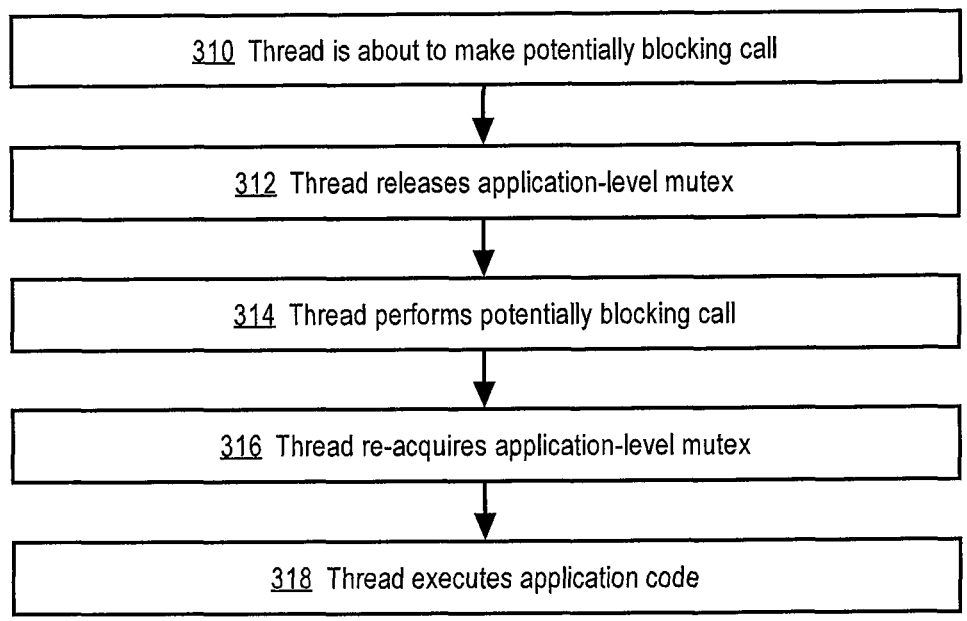
Figure 3C:
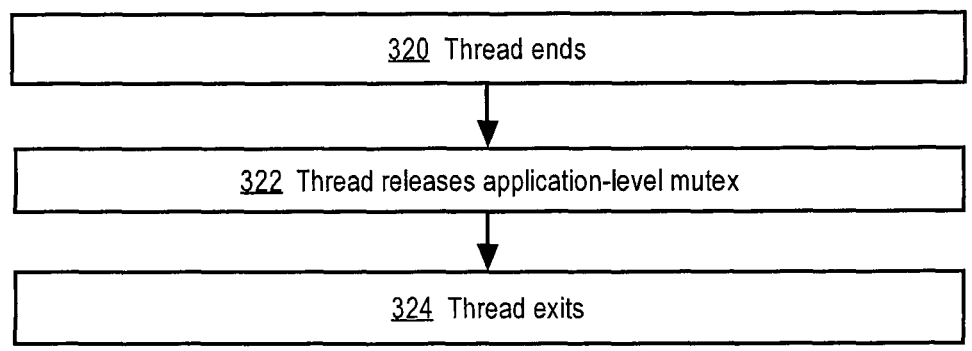

FIG. 3 is a flow diagram of one embodiment of a process 300 for ensuring deterministic thread context switching in a virtual machine application. In one embodiment, process 300 is performed both when recording and replaying the virtual machine application. At a high level, the general approach of process 300 is to provide an application-level mutex. To execute application bytecode of the virtual machine application, each thread of the virtual machine application is forced to acquire the application-level mutex, and only one application-level mutex is made available per executing virtual machine application. When the thread is about to make a potentially blocking method or function call, the thread is forced to release the application-level mutex at a deterministic point in execution, allowing other threads to acquire the application-level mutex and execute application bytecode of the virtual machine application. When the thread completes the potentially blocking call, the thread is forced to re-acquire the application-level mutex before continuing to execute application bytecode of the virtual machine application.

In one embodiment, process 300 starts in the context of a virtual machine initiating execution of a virtual machine application. In this context, the virtual machine allocates data structures and resources for executing the virtual machine application including creation of an initial or main thread of execution and transfers execution control of the main thread to the virtual machine application through a pre-defined entry point such as, for example, main( ). Once control is transferred to the virtual machine application, multiple new threads may be created by the virtual machine application.

At step 302, a single application-level mutex is created for the virtual machine application. In one embodiment, the application-level mutex is created before the virtual machine transfers control of the main thread of execution to the virtual machine application and before the main thread of execution begins to execute application bytecode of the virtual machine application. Creation of the application-level mutex can occur through instrumentation of the virtual machine application or by handling an execution event in a profiler agent such as the profiler agent 108 of FIG. 1. The application-level mutex may be any synchronization primitive suitable for ensuring mutual exclusion amongst threads of the virtual machine application. In one embodiment, the application-level mutex is a native synchronization primitive. For example, in one embodiment in which the underlying operating system is a Microsoft Windows-based operating system, the application-level mutex is a CRITICAL_SECTION object.

Steps 304 through 324 may be performed for each thread of the virtual machine application during both recorded and replayed execution.

At step 304, a thread of the virtual machine application starts execution of application code. Before the thread executes any application code of the virtual machine application, the thread is forced to acquire the application-level mutex. While the thread holds the application-level mutex all others threads are forced to wait to acquire the application-level mutex before executing any application code. Thus, by virtue of the application-level mutex, only one thread can execute application code at a time. In one embodiment, a profiler agent receives a thread start event from the virtual machine when a thread is started thereby providing the profiler agent an opportunity to force the thread to acquire the application-level mutex before the thread begins executing application bytecode. Once the thread has acquired the application-level mutex, the thread executes application code at step 308. If, at step 306, another thread of the virtual machine application currently owns the application-level mutex, then execution of application code by the thread attempting to acquire the application-level mutex is blocked until the other thread releases the application-level mutex.

At step 310, an attempt by the thread to make a potentially blocking call is intercepted or detected and, at step 312, the thread is forced to release the application-level mutex prior to the thread making the potentially blocking call at step 314.

At step 316, the thread is forced to reacquire the application-level mutex after the potentially blocking call completes and before the thread continues to execute application code at step 318. If another thread currently holds the application-level mutex when the thread completes the potentially blocking call, then the thread attempting to re-acquire the application-level mutex is forced to wait until the other thread releases the application-level mutex.

In one embodiment, the profiler agent receives an event from the virtual machine notifying that a thread is about to make a potentially blocking call giving the profiler agent an opportunity to force the thread to release the application-level mutex. Similarly, the profiler agent may receive an event from the virtual machine when the thread has completed the potentially blocking call providing the profiler agent an opportunity to force the thread to re-acquire the application-level mutex before the thread continues to execute application code.

In one embodiment, instrumented code added to the virtual machine application, when executed, detects when a thread is about to make a potentially blocking call and causes the thread to release the application-level mutex prior to the thread making the potentially blocking call. Similarly, the instrumented code, when executed, detects when the thread has completed the potentially blocking call and causes the thread to re-acquire the application-level mutex before the thread continues to execute application code.

In one embodiment, each thread of the virtual machine application is forced to release the application-level mutex prior to making selected potentially blocking calls. Which potentially blocking calls are selected depends on a variety of factors. However, in general, the selected calls may include synchronous input/output calls to the operating system hosting the virtual machine such as calls to perform network input/output, file input/output, calls to obtain user or programmatic input, timer queries, asynchronous system callbacks, etc. Thus, in some embodiments, threads do not release the application-level mutex before every potentially blocking call. Instead, the threads release the application-level mutex only before selected potentially blocking calls.

In one embodiment, each executing thread of the virtual machine application is forced to release the application-level mutex prior to invoking any native call. Native calls include calls specific to the underlying operating environment and operating system in which the virtual machine is executing. For example, in an embodiment in which the virtual machine is a Java Virtual Machine, each thread executing in the virtual machine application is forced to release the application-level mutex prior to invoking any call through the Java Native Interface (JNI). The Java Native Interface is a standard Java application programming interface that allows Java programming code of a virtual machine application to integrate with programming code of other programming languages specific to the underlying operating environment and/or operating system such as the C/C++ programming language.

At step 320, the thread is about to exit or is exiting. In such case, the thread is forced to release the application-level mutex at step 322. In one embodiment, a profiler agent receives a thread end event from the virtual machine when a thread is about to exit thereby providing the profiler agent an opportunity to force the thread to release the application-level mutex. Once the existing thread releases the application-level mutex at step 322, the thread is allowed to exit at step 324.

In one embodiment, the serialized approach of FIG. 3 is performed to ensure that the order in which application bytecode of the virtual machine application is executed by threads of the application is deterministic such that any and all race conditions that occur during a recorded execution of the virtual machine application program as a result of threads executing application code are reproduced during a replay execution of the virtual machine application. During the recorded execution, a "thread context switch" record is maintained in a computer that tracks the order in which threads of the virtual machine application program acquire the application-level mutex. Such thread context switch record may be maintained as part of or in conjunction with the replay stream information for recording non-deterministic input data to the virtual machine application. When a thread acquires the application-level mutex at step 306 or step 316, the thread context switch record is updated to reflect the order in which the thread acquired the application-level mutex. For example, the thread context switch record may comprise an ordered listing of thread identifiers. During the replayed execution, the thread context switch record is consulted to ensure that threads of the replayed virtual machine application program acquire the application-level mutex in the same order as during the record execution. Specifically, during a replay execution, before a thread is allowed to acquire the application-level mutex at step 306 or step 316, a check of the thread context switch record is made to determine if the thread is next in order. If the thread is next in order according to the thread context switch record, then the thread is allowed to acquire the application-level mutex and execute application bytecode at step 307 or step 318.

In one embodiment, the thread context switch record does not indicate the order in which threads released the application-level mutex during a corresponding recorded execution. Instead, during both record and replay execution, threads are forced to release the application-level mutex at the same deterministic points in execution of the virtual machine application. These deterministic releasing points are pre-defined to the record and replay system such as, for example, before all native calls and before all calls to exit a thread. The serialized approach includes forcing threads to release the application-level mutex at the same deterministic points during both recorded and replay execution and includes forcing threads to acquire the application-level mutex during replay execution in the same order as indicated in the thread context switch record. By virtue of theses aspects of the serialized approached, threads will also release the application-level mutex during replay execution in the same order that the threads released the application-level mutex during recorded execution. Thus, in one embodiment, recording the order in which threads release the application-level mutex in the thread context switching is not necessary.

3.2 Preventing Deadlocks in the Serialized Approach

Generally, a deadlock can occur amongst a set of threads when each thread is waiting for another thread in the set to release a shared resource such as a shared mutex. In this description, a "shared mutex" refers to any mutex other than the application-level mutex that is shared amongst one or more threads of the virtual machine application and that is acquired and by threads of the virtual machine application. For example, consider the following sequence of execution events:

| | |
|---|---|
| time 0: | Thread 1 acquires the application-level mutex. |
| t1: | Thread 1 acquires shared mutex X. |
| t2: | Thread 1 releases application level-mutex and makes blocking call. |

| | |
|---|---|
| t3: | Thread 2 acquires the application-level mutex. |
| t4: | Thread 2 attempts to acquire shared mutex X. |

When Thread 2 attempts to acquire mutex X a deadlock occurs. In particular, Thread 2 cannot acquire mutex X until Thread 1 releases mutex X, yet Thread 1 cannot release mutex X until Thread 2 releases the application-level mutex. Thread 1 and thread 2 are blocked indefinitely, each waiting for an event that will never occur.

In one embodiment of process 300, to prevent the application-level mutex from causing a deadlock, each thread of the virtual machine application is caused to release the application-level mutex prior to acquiring a shared mutex. The application-level mutex is re-acquired once the thread acquires the shared mutex.

In some circumstances, it is impracticable or undesirable to ensure that the thread currently holding the application-level mutex releases the application-level mutex before every attempt to acquire a shared mutex. For example, at the time the thread currently holding the application-level mutex attempts to acquire a shared mutex, if no other thread currently holds the shared mutex, then the thread attempting to acquire the shared mutex does not need to release the application-level mutex in order to acquire the shared mutex. This is because no other thread can acquire the shared mutex while the thread attempting to acquire the shared mutex holds the application-level mutex. When no thread holds a shared mutex at the time a thread attempts to acquire the shared mutex, then acquisition of the shared mutex by the thread is said to be "not-contended." In such a case, it is inefficient for a thread holding the application-level mutex to release the application-level mutex before acquiring the shared mutex.

Figure 4:
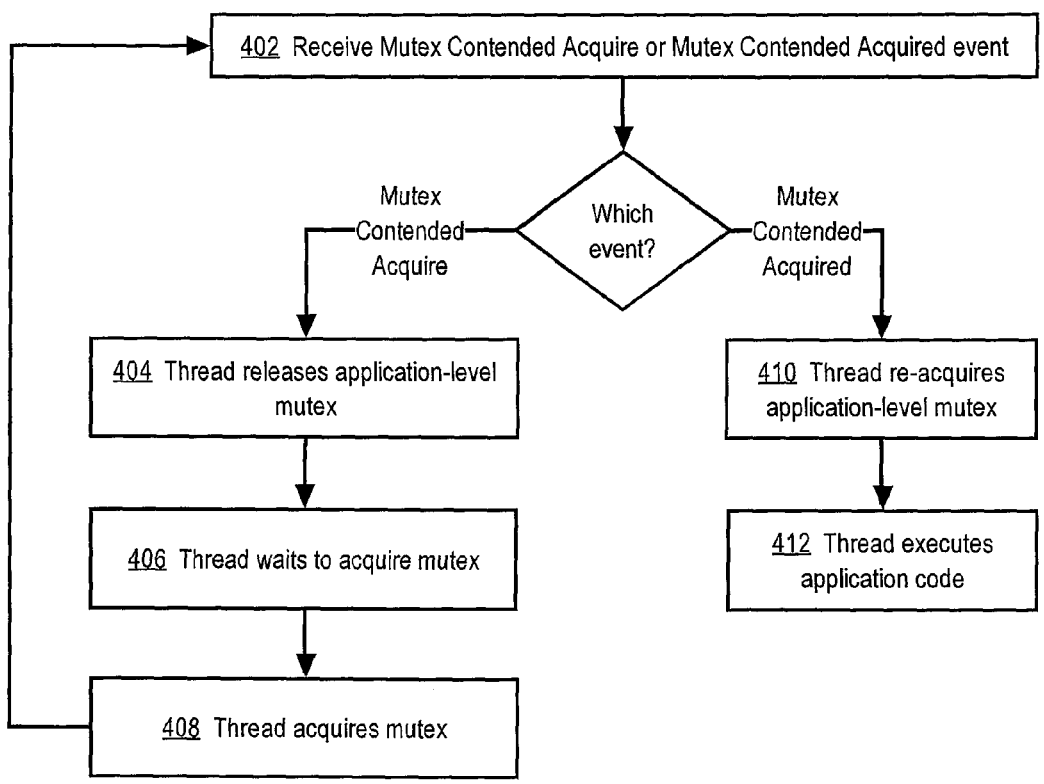
FIG. 4 is a flow diagram of one embodiment of a process for preventing deadlocks with a serialized approach for ensuring deterministic thread context switching in virtual machine applications.

FIG. 4 is a flow diagram of one embodiment of a process 400 for preventing deadlocks in the serialized approach 300 of FIG. 3 in circumstances where it is impracticable or undesirable to force a thread currently holding the application-level mutex to release the application-level mutex before an attempt by the thread to acquire a shared mutex. The steps of process 400 may be performed in conjunction with the steps of process 300. According to process 400, threads of the virtual machine application release the application-level mutex before attempting to obtain a shared mutex that is currently held by another thread (contended mutex). Advantageously, threads may retain the application-level mutex when acquiring non-contended shared mutexes. Since it is often the case that acquisition of a shared is not contended, process 400 may be performed to more efficiently prevent deadlocks in the serialized approach for ensuring deterministic thread context switching.

In one embodiment, the virtual machine provides two types of events to a profiler agent through an API such as profiler API 114 of FIG. 1. First, when a thread of the virtual machine application attempts to acquire a shared mutex which is currently held by another thread, the virtual machine generates what is termed herein as a "mutex contended acquire" event and sends the event to the profiler agent. Second, when a thread of the virtual machine application acquires a shared mutex for which it was contending with another thread, the virtual machine generates what is termed a "mutex contended acquired" event and sends the event to the profiler agent. The actual terminology for these types of events may vary depending on the particular type of virtual machine. For example, in an embodiment where the virtual machine is a Java Virtual Machine, these two types of events are termed "Monitor Contended Enter" and "Monitor Contended Entered" respectively.

Process 400 of FIG. 4 starts in the context of a running thread currently holding the application-level mutex as in steps 308 or 318 of process 300.

At step 402, the profiler agent receives either a Mutex Contended Acquire event or a Mutex Contended Acquired event. Assume, for the purpose of explanation, that a running thread (Thread A) currently holding the application-level mutex attempts to acquire a shared mutex (Shared Mutex X) which is currently held by another thread (Thread B). Upon such attempt, a Mutex Contended Acquire event is sent to the profiler agent. In one embodiment, information associated with the Mutex Contended Acquire and Mutex Contended Acquired events sent to the profiler agent indicates the thread (e.g., Thread A) and, in the case of a Mutex Contended Acquire event, the shared mutex the thread is attempting to acquire or, in the case of a Mutex Contended Acquired event, the shared mutex the thread acquired.

At step 404, the profiler agent, having received a Mutex Contended Acquire event, causes Thread A to release the application-level mutex. This allows Thread B to acquire the application-level mutex, execute application code, and ultimately release Shared Mutex X. At step 406, Thread A waits until Shared Mutex X can be acquired which cannot occur until Thread B releases Mutex X.

At step 408, Thread A acquires Shared Mutex X after which the profiler agent receives a Mutex Contended Acquired event at step 402 notifying the profiler agent that Thread A has acquired a shared mutex for which it was contending. At step 410, having received a Mutex Contended Acquired event for Thread A and Shared Mutex X, the profiler agent causes Thread A to re-acquire the application-level mutex. At step 412, Thread A continues executing application code.

3.3 Enhancements to the Serialized Approach

In most circumstances, because the serialized approach requires that threads hold the application-level mutex while executing application code, a thread will not acquire a shared mutex without holding the application-level mutex. Thus, in most circumstances, acquisition of a shared mutex during replay execution is deterministic and occurs at the same point in execution of the virtual machine application in both a recoded execution and the replay execution from the recording. When a thread acquires a shared mutex while holding the application-level mutex, the acquisition of the shared mutex by the thread can be said to be a "deterministic mutex acquisition". In some circumstances however, some potentially blocking calls made by a thread when the thread does not hold the application-level mutex cause the thread to attempt to acquire a shared mutex. An example of such a potentially blocking call is provided below. When a thread acquires a shared mutex while not holding the application-level mutex, the acquisition of the mutex by the thread can be said to be a "non-deterministic mutex acquisition". The acquisition of the shared mutex in this case is non-deterministic because whether the thread contends for the shared mutex with another thread, and thus whether Mutex Contended Acquire and Mutex Contended Acquired events are generated by the virtual machine, depends on non-deterministic factors such as the scheduling and context switching of the contending threads by the underlying operating system. Consequently, there is a period of time between a deterministic thread context switch—i.e., a period of between when one thread releases the application-level mutex and another thread acquires the application-level mutex—when a thread may make a non-deterministic mutex acquisition. Such a non-deterministic mutex acquisition can cause the presence of Mutex Contended Acquire and Mutex Contended Acquired events to be different between recorded and replayed executions. To see this, consider the following example execution sequence of a multi-thread virtual machine application. In the following example, to aide in understanding the example, reference is made to the Java programming language and Java thread synchronization constructs. However, it should be understood that the principles illustrated by the examples are generally applicable to virtually any multi-threaded programming language suitable for developing a virtual machine application.

At time t0, Thread 1 is executing application bytecode while holding application-level mutex as in step 308 or step 318 of process 300.

At time t1, Thread 1 enters the Java monitor of Object O while holding the application-level mutex. As background, Java employs a thread synchronization primitive known as a Java monitor for enforcing mutual exclusion. Thus, a Java monitor is one type of mutex. Every object in Java has a Java monitor which only one thread can enter at a time. To enforce mutually exclusive access to state of an object, a thread can be forced to enter the object's Java monitor before accessing the object's state and forced to exit the object's Java monitor when the thread is finished accessing the object's state. While a thread has entered a Java monitor, no other thread may enter the Java monitor. In this description, when referring generally to thread mutual exclusion mechanisms the terms "mutex", "acquiring a mutex", and "releasing a mutex" are used. In the context of Java that uses Java monitors for enforcing mutual exclusion, reference to a "Java monitor", "entering a Java monitor", and "exiting a Java monitor" should be understood as specific examples of a "mutex", "acquiring a mutex", and "releasing a mutex" respectively.

Continuing the example, at time t2, Thread 1 is about to make a potentially blocking call as in step 310 of process 300. In particular, in this example, Thread 1 is about to call wait( ) on Object O. As more background, every object in Java provides a method wait( ). The semantics of wait( ) are such that if the thread calling wait( ) on an object has currently entered that object's Java monitor, then the thread is forced to exit the object's Java monitor and wait until another thread calls notify( ) on the object. When another thread calls notify( ) on the object, the thread returns from waiting and re-enters the object's Java monitor.

Continuing the example, at time t3, before Thread 1 calls wait( ) on Object O, Thread 1 is forced to release application-level mutex as in step 312 of process 300. After the application-level mutex is released by Thread 1, another thread can acquire the application-level mutex and potentially attempt to enter the Object O's Java monitor. If, because of non-deterministic thread context switching, another thread (Thread 2) acquires the application-level mutex, executes application code, and attempts to enter Object O's monitor before Thread 1 exits Object O's monitor as a result of calling wait( ) on Object O, then the virtual machine will generate a Monitor Contended Acquire event as in step 402 of process 400 for Thread 2 because Thread 2 is contending for Object O's Java monitor with Thread 1 (which has not yet exited Object O's Java monitor). On the other hand, if Thread 1 calls wait( ) on Object O and, as a result, exits Object O's Java monitor before a thread context switch to Thread 2, then, upon Thread 2 attempting to enter Object O's Java monitor, the virtual machine will not generate a Monitor Contended Acquire event for Thread 2. Thus, as illustrated by this example, causing a thread to release the application-level mutex prior to the thread making some potentially blocking calls can create a window of time in which multiple threads "race" to contend for a mutex and determining the order in which the contention is resolved is not readily predictable because of the non-deterministic nature of thread context switching.

This type of race condition can be problematic when replaying a virtual machine application. For example, this type of race condition can cause the replay stream to be "out-of-sync" on replay. The term "out-of-sync" as used herein refers to encountering sources of non-determinism during replay execution of the virtual machine application in the debugging environment differently than they were recorded in the replay stream during the recorded execution of the virtual machine application in the production environment. For example, returning again to the example above, assume during a recorded execution of the virtual machine application in a production environment that information is recorded in a replay stream based on Thread 2 contending with Thread 1 for Object O's Java monitor. If, on replay of the virtual machine Application in a debugging environment, because of the non-deterministic nature of thread context switching, Thread 1 exits Object O's monitor before Thread 2 attempts to enter Object O's Java monitor, then Thread 2 will not contend for Object O's Java monitor as it did during record. Because of this, the replay stream will be out-of-sync. In particular, a source of non-determinism encountered by the virtual machine application on replay may be provided information from the replay stream recorded about the contention between Threads 1 and 2 that occurred during recording in the production environment but did not occur on replay in the debugging environment.

Figure 5A:
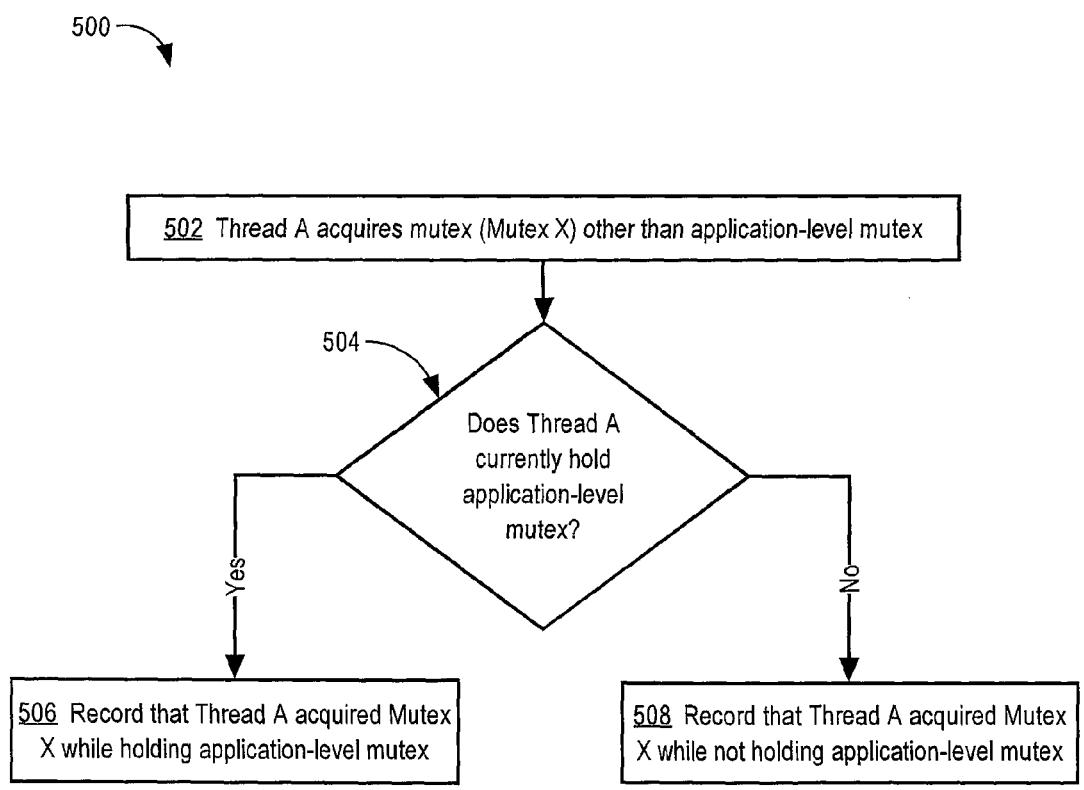
FIG. 5 is a flow diagram of one embodiment of a process for preventing a race condition arising from a non-deterministic mutex acquisition.
Figure 5B:
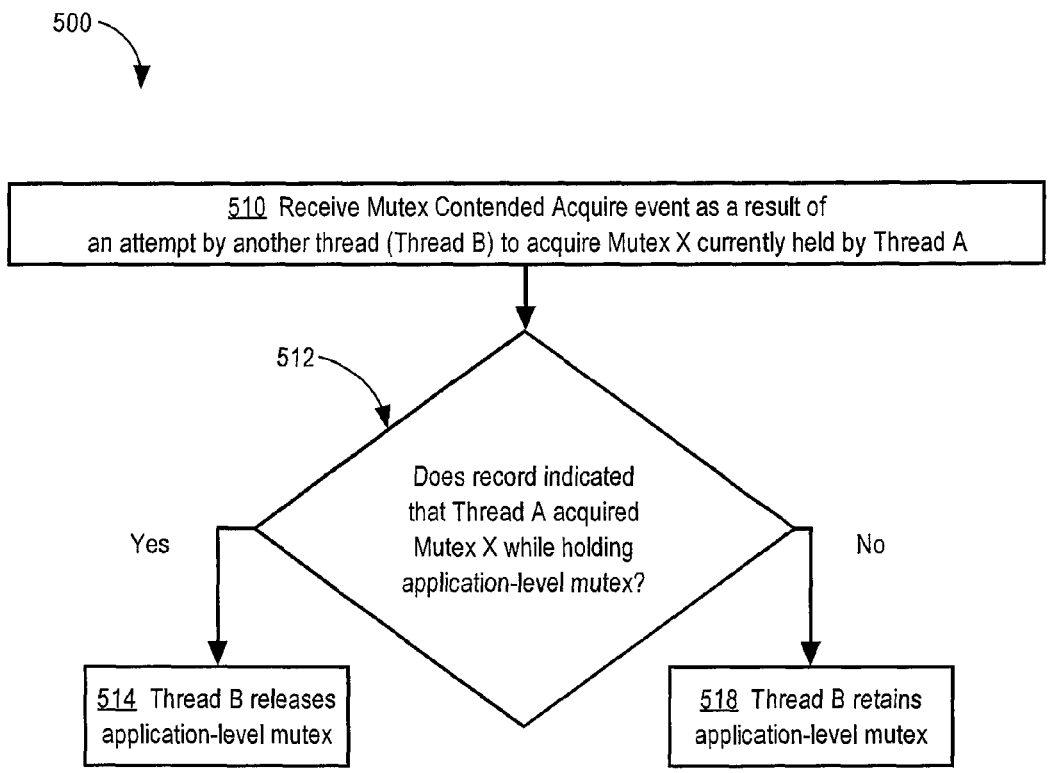

FIG. 5 is a flow diagram of one embodiment of a process 500 for preventing race conditions arising from a non-deterministic mutex acquisition. In one embodiment, the steps of process 500 are performed by a record and replay system during both record and replay of a virtual machine application in conjunction the steps of process 300 and the steps of process 400 described previously.

The general approach of process 500 may be summarized as follows. When a thread (e.g, Thread A) of the virtual machine application acquires a mutex, the record and replay system creates and stores an entry in a "mutex acquisition" record indicating whether the thread acquired the mutex while holding the application-level mutex (i.e., a deterministic mutex acquisition) or whether the thread acquired the mutex while not holding the application-level mutex (i.e., a non-deterministic mutex acquisition). The mutex acquisition record may be maintained by a record and replay system in conjunction with the thread context switch record and the replay stream.

When another thread (e.g. Thread B) attempts to acquire a mutex, other than the application-level mutex, that is currently held by a thread (e.g., Thread A), the record and replay system examines the mutex acquisition record to determine whether the acquisition of the mutex by the thread currently holding the mutex (Thread A) was a deterministic mutex acquisition or a non-deterministic mutex acquisition. If the acquisition was a deterministic mutex acquisition, then the contending thread (Thread B) releases the application-level mutex allowing the thread currently holding the mutex (Thread A) to acquire the application-level mutex and ultimately release the mutex that the contending thread (Thread B) is attempting to acquire. On the other hand, if the acquisition was a non-deterministic mutex contention, then the contending thread (Thread B) retains the application-level mutex and waits for the thread currently holding the mutex (Thread A) to release the mutex that the contending thread (Thread B) is attempting to acquire. By forcing the thread contending for the mutex (Thread B) to retain the application-level mutex in a situation where there has been a non-deterministic mutex acquisition, the thread that acquired the mutex non-deterministically (Thread A) is forced to release the mutex before that thread (Thread A) acquires the application-level mutex and proceeds to execute application bytecode; thereby ensuring that threads of the virtual machine application can be forced to execute application bytecode in the same order across multiple executions.

The steps of process 500 will now be explained in greater detail. At step 502, a thread (Thread A) acquires a mutex (Mutex X) other than the application-level mutex. As mentioned, a thread may acquire a mutex deterministically (i.e., while holding the application-level mutex) or non-deterministically (i.e., while not holding the application-level mutex). As explained above, some potentially blocking calls (e.g., wait( ) on Java object) may cause a thread to acquire a mutex non-deterministically.

At step 504, the record and replay system determines whether the thread (Thread A) acquired the mutex (Mutex X) deterministically (i.e., while holding the application-level mutex) or non-deterministically (i.e., while not holding the application-level mutex). In one embodiment, such determination is made through instrumented code added to the virtual machine application. In another embodiment, such determination is performed by a profiler agent upon receiving an execution event from the virtual machine. The determination may involve instrumented code or the profiler agent invoking APIs provided by the virtual machine to determine whether the thread (Thread A) acquired the mutex (Mutex X) deterministically or non-deterministically.

At step 506, if the determination in step 504 revealed that the thread (Thread A) acquired the mutex (Mutex X) deterministically, then the record and replay system adds an entry to the mutex acquisition record that indicates, for a particular point in a recorded or replayed execution sequence of the virtual machine application corresponding to the acquisition of the mutex (Mutex X) by the thread (Thread A), that the thread (Thread A) acquired the mutex (Mutex X) at the particular point in the execution sequence while holding the application-level mutex (i.e., acquired the mutex (Mutex X) deterministically). At step 508, if, on the other hand, the determination at step 504 revealed that the thread (Thread A) acquired the mutex (Mutex X) non-deterministically, then the record and replay system adds an entry to the mutex acquisition record that indicates, for the particular point in the execution sequence, that the thread (Thread A) acquired the mutex (Mutex X) while not holding the application-level mutex (i.e., acquired the mutex (Mutex) non-deterministically).

At step 510, the virtual machine generates a Mutex Contended Acquire event in response to an attempt by another thread (Thread B) to acquire the mutex (Mutex X). In response to the event, the record and replay system consults the mutex acquisition record to determine whether the mutex (Mutex X) was acquired deterministically or non-deterministically If the mutex acquisition record indicates that the mutex (Mutex X) was acquired deterministically, then at step 514, the contending thread (Thread B) is forced to release the application-level mutex. On the other hand, if the mutex acquisition record indicates that the mutex (Mutex X) was acquired non-deterministically, then at step 518, the contending thread (Thread B) retains the application-level mutex until the contending thread (Thread B) can acquire the mutex (Mutex X).

4.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computer systems, desktop computer systems, portable computer systems, handheld devices, networking devices or any other device that incorporates hard-wired and/or program logic to implement the techniques.

Figure 6:
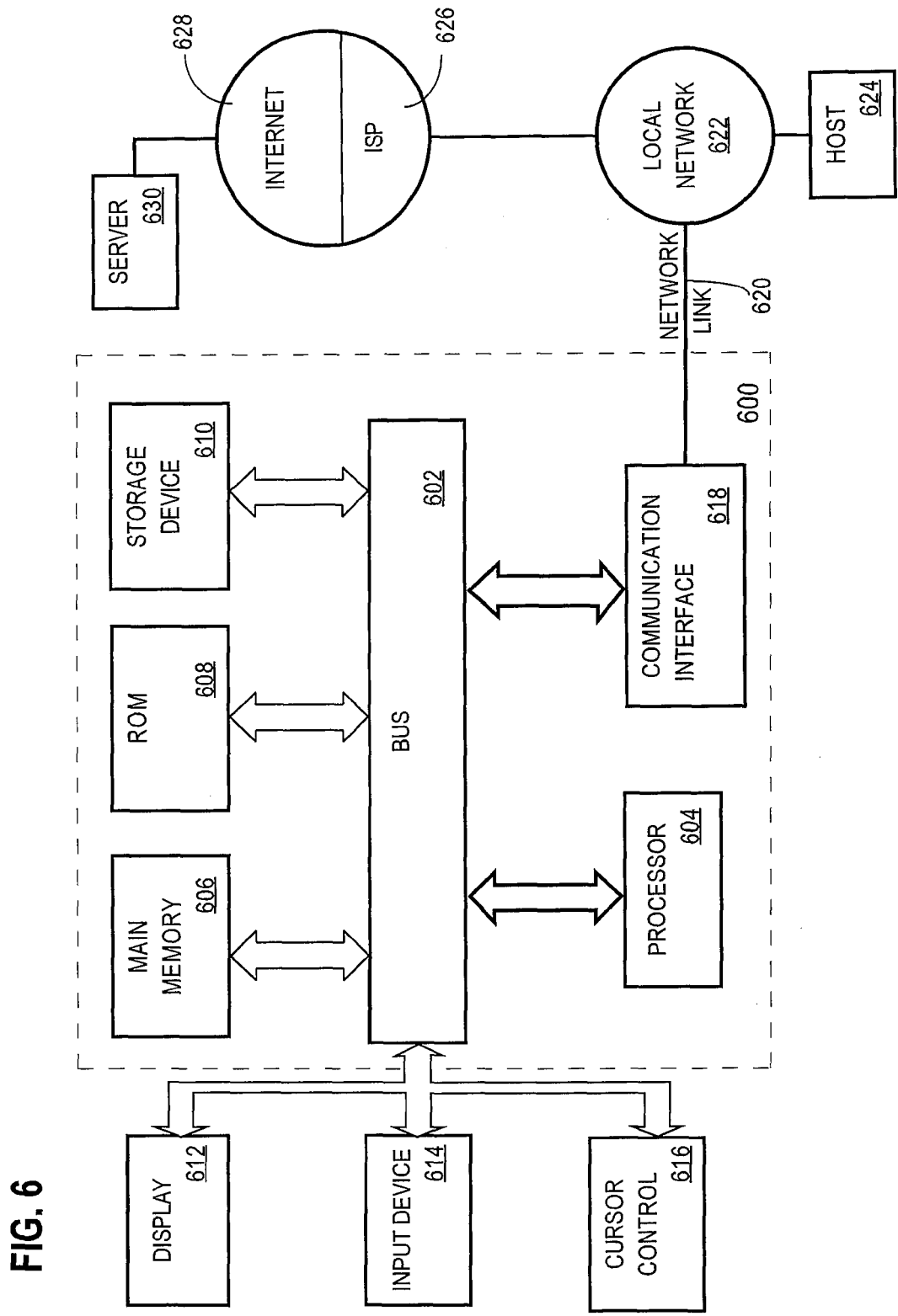
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory media or storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The terms "non-transitory media" and "storage media" as used herein refer to any media that store data and/or instructions that cause a machine to operate in a specific fashion. Such media may comprise non-volatile media and/or volatile media. Non-volatile media includes, for example, optical or magnetic disks, such as storage device 610. Volatile media includes dynamic memory, such as main memory 606. Common forms of non-transitory media and storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media and storage media are distinct from but may be used in conjunction with transmission media. Transmission media participates in transferring information between non-transitory media and storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable non-transitory medium storing computer-executable instructions, the computer-executable instructions comprising:

computer-executable instructions configured to create a single application-level mutex and forcing a first thread among a plurality of threads of an executing virtual machine application program to acquire the application-level mutex;

computer-executable instructions configured to detect when the first thread is about to make a potentially blocking call;

computer-executable instructions configured to force the first thread to release the application-level mutex prior to the first thread making the potentially blocking call allowing another thread of the plurality of threads to acquire the application-level mutex;

computer-executable instructions configured to detect when the first thread has completed the potentially blocking call;

computer-executable instructions configured to force the first thread to re-acquire the application-level mutex after the first thread completes the potentially blocking call;

computer-executable instructions configured to create and store a record in a computer indicating whether threads acquire mutexes other than the application-level mutex during execution of the virtual machine application program (a) while holding the application-level mutex or (b) while not holding the application-level mutex;

computer-executable instructions configured to use said record when the first thread attempts to acquire a first mutex, other than the application-level mutex, that is then held by a second thread of the plurality of threads to determine whether the second thread acquired the first mutex (a) while holding the application-level mutex or (b) while not holding the application-level mutex; and computer-executable instructions configured to force the first thread to release the application-level mutex if said record indicates that the second thread acquired the first mutex while holding the application-level mutex; and computer-executable instructions configured to allow the first thread to retain the application-level mutex at least until the second thread releases the first mutex if said record indicates that the second thread acquired the first mutex while not holding the application-level mutex.

2. The computer-readable non-transitory medium of claim 1, further storing computer-executable instructions configured to:

create and store a record in a computer indicating an order in which threads acquire the application-level mutex during execution of the virtual machine application program.

3. The computer-readable non-transitory medium of claim 2, further storing computer-executable instructions configured to:

manage threads during a replay execution of the virtual machine application program to ensure that the application-level mutex is acquired by threads in the same order indicated in the record.

4. The computer-readable non-transitory medium of claim 1, wherein the potentially blocking call is a call to acquire a mutex other than the application-level mutex.

5. The computer-readable non-transitory medium of claim 1, wherein the potentially blocking call is a native call.

6. The computer-readable medium of claim 1, further storing computer-executable instructions configured to:

force a thread of the plurality of threads to release the application-level mutex before an attempt to acquire a mutex other than the application-level mutex.

7. The computer-readable non-transitory medium of claim 1, further storing computer-executable instructions configured to:

receive a first notification of an attempt by the first thread to acquire a first mutex, other than the application-level mutex, when the first mutex is then held by a second thread of the plurality of threads; and in response to receiving the first notification, force the first thread to release the application-level mutex allowing the second thread to acquire the application-level mutex and release the first mutex.

8. The computer-readable non-transitory medium of claim 7, further storing computer-executable instructions configured to:

receive a second notification that the first thread has acquired the first mutex; and in response to receiving the second notification, force the first thread to re-acquire the application-level mutex.

9. The computer-readable non-transitory medium of claim 1, wherein said computer-executable instructions configured to detect when the first thread is about to make a potentially blocking call comprise computer-executable instructions configured to receive an event from the virtual machine executing the virtual machine application program indicating that the first thread is about to make a potentially blocking call.

10. The computer-readable non-transitory medium of claim 9, wherein the event is a Java Virtual Machine Tool Interface (JVMTI) event.

11. The computer-readable non-transitory medium of claim 1, wherein the computer-executable instructions configured to detect when the first thread has completed the potentially blocking call comprise computer-executable instructions configured to receive an event from the virtual machine executing the virtual machine application program indicating that the first thread has completed the potentially blocking call.

12. The computer-readable non-transitory medium of claim 11, wherein the event is a Java Virtual Machine Tool Interface (JVMTI) event.

13. A method comprising:

creating a single application-level mutex and forcing a first thread among a plurality of threads of an executing virtual machine application program to acquire the application-level mutex;

detecting when the first thread is about to make a potentially blocking call;

forcing the first thread to release the application-level mutex prior to the first thread making the potentially blocking call allowing another thread of the plurality of threads to acquire the application-level mutex;

detecting when the first thread has completed the potentially blocking call;

forcing the first thread to re-acquire the application-level mutex after the first thread completes the potentially blocking call;

creating and storing a record in a computer indicating whether threads acquire mutexes other than the application-level mutex during execution of the virtual machine application program (a) while holding the application-level mutex or (b) while not holding the application-level mutex;

detecting that there is a contention for a first mutex between the first thread and a second thread while the first thread holds the application level mutex and the second thread holds the first mutex;

forcing the first thread to release the application level mutex in response to determining based on the record that the first mutex was acquired by the second thread while holding the application-level mutex; and allowing the first thread to retain the application level mutex at least until the second thread releases the first mutex in response to determining based on the record that the first mutex was acquired by the second thread while not holding the application-level mutex, wherein the method is performed by a computing device.

14. The method of claim 13, further comprising:

creating and storing a record in a computer indicating an order in which threads acquire the application-level mutex during execution of the virtual machine application program.

15. The method of claim 14, further comprising:

managing threads during a replay execution of the virtual machine application program to ensure that the application-level mutex is acquired by threads in the same order indicated in the record.

16. The method of claim 13, wherein the potentially blocking call is a call to acquire a mutex other than the application-level mutex.

17. The method of claim 13, wherein the potentially blocking call is a native call.

18. The method of claim 13, further comprising:

forcing a third thread of the plurality of threads to release the application-level mutex before an attempt to acquire a second mutex other than the application-level mutex.

19. The method of claim 13, further comprising:

receiving a first notification of an attempt by the first thread to acquire a second mutex, other than the application-level mutex, when the second mutex is then held by a third thread of the plurality of threads; and in response to receiving the first notification, forcing the first thread to release the application-level mutex allowing the third thread to acquire the application-level mutex and release the first second mutex.

20. The method of claim 19, further comprising:
receiving a second notification that the first thread has acquired the second mutex; and
in response to receiving the second notification, forcing the first thread to re-acquire the application-level mutex.

21. The method of claim 13, wherein detecting when the first thread is about to make a potentially blocking call comprises receiving an event from the virtual machine executing the virtual machine application program indicating that the first thread is about to make a potentially blocking call.

22. The method of claim 21, wherein the event is a Java Virtual Machine Tool Interface (JVMTI) event.

23. The method of claim 13, wherein detecting when the first thread has completed the potentially blocking call comprises receiving an event from the virtual machine executing the virtual machine application program indicating that the first thread has completed the potentially blocking call.

24. The method of claim 23, wherein the event is a Java Virtual Machine Tool Interface (JVMTI) event.

25. A computer system comprising:
a processor that is configured to:
create a single application-level mutex;
force a first thread among a plurality of threads of an executing virtual machine application program to acquire the application-level mutex;
create and store a record indicating whether threads acquire mutexes other than the application-level mutex during execution of the virtual machine application program (a) while holding the application-level mutex or (b) while not holding the application-level mutex;
detect that there is a contention for a first mutex between the first thread and a second thread while the first thread holds the application level mutex and the second thread holds the first mutex;
force the first thread to release the application level mutex in response to determining based on the record that the first mutex was acquired by the second thread while holding the application-level mutex; and
allow the first thread to retain the application level mutex at least until the second thread releases the first mutex in response to determining based on the record that the first mutex was acquired by the second thread while not holding the application-level mutex.

26. A method comprising:
creating a single application-level mutex;
forcing a first thread among a plurality of threads of an executing virtual machine application program to acquire the application-level mutex;

creating and storing a record in a computer indicating whether threads acquire mutexes other than the application-level mutex during execution of the virtual machine application program (a) while holding the application-level mutex or (b) while not holding the application-level mutex;
using said record when the first thread attempts to acquire a first mutex, other than the application-level mutex, that is then held by a second thread of the plurality of threads to determine whether the second thread acquired the first mutex (a) while holding the application-level mutex or (b) while not holding the application-level mutex; and
if said record indicates that the second thread acquired the first mutex (a) while holding the application-level mutex, then forcing the first thread to release the application-level mutex; and
if said record indicates that the second thread acquired the first mutex (b) while not holding the application-level mutex, then allowing the first thread to retain the application-level mutex at least until the second thread releases the first mutex.

27. A computer-readable non-transitory medium storing computer-executable instructions, the computer-executable instructions comprising:
computer-executable instructions configured to create a single application-level mutex;
computer-executable instructions configured to force a first thread among a plurality of threads of an executing virtual machine application program to acquire the application-level mutex;
computer-executable instructions configured to create and store a record in a computer indicating whether threads acquire mutexes other than the application-level mutex during execution of the virtual machine application program (a) while holding the application-level mutex or (b) while not holding the application-level mutex;
computer-executable instructions configured to detect that there is a contention for a first mutex between the first thread and a second thread while the first thread holds the application level mutex and the second thread holds the first mutex;
computer-executable instructions configured to force the first thread to release the application level mutex in response to determining based on the record that the first mutex was acquired by the second thread while holding the application-level mutex; and
computer-executable instructions configured to allow the first thread to retain the application level mutex at least until the second thread releases the first mutex in response to determining based on the record that the first mutex was acquired by the second thread while not holding the application-level mutex.

* * * * *

UNITED STATES PATENT AND TRADEMARK OFFICE
CERTIFICATE OF CORRECTION

PATENT NO. : 8,499,299 B1
APPLICATION NO. : 12/825932
DATED : July 30, 2013
INVENTOR(S) : Arpad Jakab et al.

It is certified that error appears in the above-identified patent and that said Letters Patent is hereby corrected as shown below:

In the Claims

Column 23, line 4 (claim 19, line 9) please change "first second mutex" to -- second mutex --

Signed and Sealed this
Thirteenth Day of May, 2014

Michelle K. Lee
*Deputy Director of the United States Patent and Trademark Office*